(12) United States Patent
Thomas et al.

(10) Patent No.: US 8,112,450 B2
(45) Date of Patent: Feb. 7, 2012

(54) PRIORITY MESSAGING AND PRIORITY SCHEDULING

(75) Inventors: Michael W. Thomas, Redmond, WA (US); Remus Rusanu, Redmond, WA (US); Michael Edward Nelson, Redmond, WA (US); Rushi Desai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 880 days.

(21) Appl. No.: 12/023,209

(22) Filed: Jan. 31, 2008

(65) Prior Publication Data

US 2009/0199207 A1 Aug. 6, 2009

(51) Int. Cl.
*G06F 17/30* (2006.01)
*G06F 12/00* (2006.01)
(52) U.S. Cl. ........................... 707/802; 707/758
(58) Field of Classification Search .................. 707/802, 707/758
See application file for complete search history.

(56) References Cited

U.S. PATENT DOCUMENTS

| | | | |
|---|---|---|---|
| 6,055,564 A | 4/2000 | Phaal | |
| 6,788,702 B1 | 9/2004 | Garcia-Luna-Aceves et al. | |
| 6,883,031 B1 | 4/2005 | Hurley et al. | |
| 6,934,950 B1 | 8/2005 | Tuel et al. | |
| 7,020,697 B1* | 3/2006 | Goodman et al. | 709/223 |
| 7,647,411 B1* | 1/2010 | Schiavone et al. | 709/229 |
| 7,869,435 B2* | 1/2011 | Seguchi et al. | 370/392 |
| 2004/0133683 A1* | 7/2004 | Keller et al. | 709/227 |
| 2004/0156360 A1 | 8/2004 | Sexton et al. | |
| 2004/0205124 A1 | 10/2004 | Limprecht et al. | |
| 2005/0058149 A1 | 3/2005 | Howe | |
| 2005/0100002 A1* | 5/2005 | Oouchi et al. | 370/352 |
| 2005/0149608 A1 | 7/2005 | Sanjay | |
| 2005/0158697 A1* | 7/2005 | Nelson et al. | 434/350 |
| 2007/0038791 A1* | 2/2007 | Subramanian et al. | 710/116 |
| 2007/0206620 A1 | 9/2007 | Cortes et al. | |
| 2008/0049761 A1* | 2/2008 | Lin et al. | 370/395.21 |

OTHER PUBLICATIONS

Antonio Meschi, et al. Earliest Deadline Message Scheduling with Limited Priority Inversion. http://citeseer.ist.psu.edu/cache/papers/cs/529/http:zSzzSzretis.sssup.itzSzpaperszSzwpdrts96.pdf/meschi96earliest. pdf. Last accessed Nov. 6, 2007, 8 pages.
Carlos Cardeira, et al. Using Task Scheduling Algorithms for Fieldbus Traffic Scheduling. http://www.dem.ist.utl.pt/~cardeira/papers/measurement.pdf. Last accessed Nov. 6, 2007, 25 pages.
Ludmila Cherkasova, et al. On the Effects of Message Scheduling for Packet Switching Interconnect Fabric http://www.hpl.hp.com/techreports/94/HPL-94-70.ps. Last accessed Nov. 6, 2007, 28 pages.
Eduardo Tovar, et al. Scheduling Real-Time Communications with P-NET. http://www.hurray.isep.ipp.pt/privfiles/hurray-tr-9802.pdf. Last accessed Nov. 6, 2007, 4 pages.

* cited by examiner

*Primary Examiner* — Kuen Lu
(74) *Attorney, Agent, or Firm* — Workman Nydegger

(57) ABSTRACT

Systems and methods that set priority levels to messaging systems initiated between end points (e.g., two SQL point services) thru service brokers. A priority component can apply priority at a session level to add priority capabilities on top of service brokers, and enable setting priority for all the messages in a session or conversation. Such priority can further affect the order in which messages from different conversations are sent and the order in which they are received.

20 Claims, 10 Drawing Sheets

PRIORITY MESSAGING AND PRIORITY SCHEDULING

BACKGROUND

Computing and networking technologies have transformed many important aspects of everyday life. Computers have become a household staple instead of a luxury, and provide users with a tool to manage and forecast finances, control household operations like heating, cooling, lighting and security, and store records and images in a permanent and reliable medium. Networking technologies like the Internet provide users with virtually unlimited access to remote systems, information and associated applications.

Traditional business practices are evolving with computing and networking technologies. For example, a conventional banking transaction can include gathering information such as bank account number, passbook and identification, dedicating time to travel to the bank, procuring transportation, waiting in line and utilizing tellers to facilitate a banking transactions. Today, consumers can access their accounts via the Internet and perform a growing number of available transactions such as balance inquiries, funds transfers and bill payment with the click of a mouse button.

As computing and networking technologies become robust, secure and reliable, more consumers, wholesalers, retailers, entrepreneurs, educational institutions, advocacy groups and the like are shifting paradigms and employing the Internet to perform business instead of the traditional means. For example, many businesses and consumers are providing web sites and/or on-line services (e.g., for purchasing food and clothing, searching for information, sending email and playing interactive games). In another example, a stock market web site can provide the user with tools for retrieving stock quotes and purchasing stock.

Typically, a user interfaces with a client(s) application (e.g., a web page) to interact with a server(s) that stores information in a database that is accessible to the client application. Databases provide a persistent, durable store for data that can be shared across multiple users and applications. Client(s) applications generally retrieve data from the database through a query(s), which returns results containing the subset of data interesting to the application. The application then consumes, displays, transforms, stores, or acts on those results, and may submit changes based on the results retrieved.

Moreover, messaging systems are typically employed to transfer data between computers, databases and other entities. Each entity participating in message transfer (e.g., an "endpoint") can be employed for various purposes, such as; archiving data, event notification, enabling loosely connected applications that have components on multiple endpoints, and the like.

In such systems, the message throughput and latency are limited by various resource constraints, including network connectivity, network bandwidth, processor speed, memory, and disk space. These constraints can exist in either endpoint or at other locations on the connecting network. As such, throughput and latency of the system are typically limited by the slowest component, resulting in a variable latency between the time a message is sent and the time it is received. For example, the message send rate may exceed the throughput the system is capable of and thus latency increases for some or all messages.

For example, a chain of retail stores can be connected to a central database. The central database can contains customer records, transaction records, inventory, product descriptions, and pricing. It can become necessary for a store to access a customer record or inventory while the customer is waiting at the cash register. Hence, messages related to retrieval of customer records from the central database are required to be delivered quickly. Likewise, updates to product descriptions and pricing are generally not time critical. Furthermore, such updates can be quite large and take a lot of time and resources to transfer.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation supplies prioritizing capabilities and sets priority levels to messaging systems via employing a priority component that operates on session initiated between end points (e.g., two SQL point services) thru service brokers. Such priority component can apply priority at a session level to add priority capabilities on top of service brokers, and enable setting priority for all the messages in a session or conversation. Accordingly, an administrator or application can set the priority for a specific conversation, either by configuration (e.g., via a configuration component) or programmatically (e.g., to enable configuring/applying priority to a session of messages.)

Such priority can further affect the order in which messages from different conversations are sent and the order in which they are received. Moreover, the configuration component can implement configuration rules that are exposable as Transactional Structured Query Language (TSQL) statements to apply configurations (e.g., automatically) to session(s), whenever the session is further associated with a contract (e.g., based on a local service name, remote service name, and the like.) The priority can be set automatically at each endpoint when the session is created, based on a set of Configuration Rules. At the initiator endpoint, the session is typically created programmatically, and at the target endpoint, the session is in general created when the first message of that session is received. Moreover, each configuration rule can contain a numeric identifier and a name that are unique and either can be used to identify the configuration rule.

In a related aspect, the configuration rules contain a set of criteria values, wherein the columns are employed to verify if a rule matches a specific session. For example, null values indicate wildcards that match any value, and there cannot be multiple configuration rules with identical sets of criteria value—however, there may be overlapping configuration rules with wildcards.

Hence, each end point can be configured independent of other end points, or send or receive processes. In a related aspect, a scheduling component can be associated with the priority component to employ a transport layer for sending messages with starvation prevention after sessions have been created and priority classes defined, wherein lower priority messages are conferred a chance to be sent, even if there are higher priority messages ready to send. Effective priorities can be defined that are incremented upon a predetermined number of times messages associated with a session or priority are processed.

According to a methodology of the subject innovation, initially a service broker can be configured by a program or a user, wherein SQL server objects for services and contracts, routes for remote servers, configuration of property rules, can be created, for example. Subsequently a programmer or user can open a service broker dialog or session, wherein configuration rules can be applied and priority assigned to an associated session. Likewise, a remote server includes independent set of priority rules and different settings/priority rules, so that end points have different priorities for the same session. Subsequently, a message is being sent for a session that is opened and assigned a priority, wherein a transmitter component includes a list of all sessions and associated messages that are ready to be sent. In addition, internal to the transmitter component services with various configurations can exist, wherein various priority classes can be defined. Moreover, a destination manager can manage corresponding destinations and remote end points for message exchange. Such destination manager can call process methods into the scheduling component for processing messages associated with a session.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
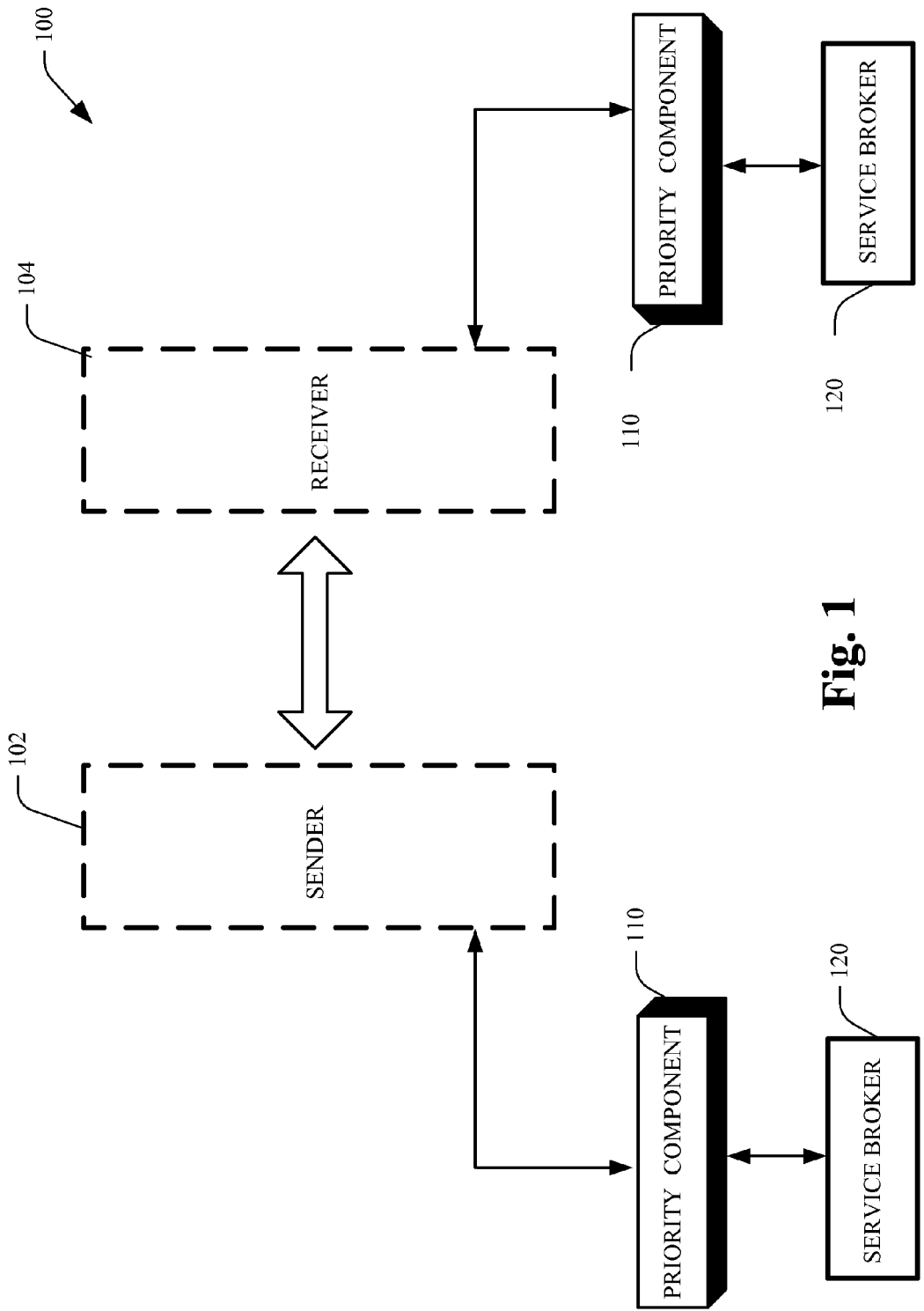
FIG. 1 illustrates a block diagram of a priority component that prioritizes messages in a session initiated thru service brokers in accordance with an aspect of the subject innovation.

FIG. 1 illustrates a block diagram of a priority component 110 that operates in a session initiated thru service broker(s) 120 in accordance with an aspect of the subject innovation. It is to be appreciated that the system 100 illustrated in FIG. 1 is schematic in nature, wherein a service broker(s) can exist as a non-centralized component for each endpoint. Moreover, the priority component 110 can be part of the service broker 120. The service broker 120 can employ queues to provide loose coupling between the message sender 102 and the message receiver 104. The sender 102 can implement commands to place a message in a queue and then continue with the application, relying on service broker 120 to ensure that the message reaches its destination. The system 100 enables prioritizing capabilities for exchanged messages between the sender 102 and receiver 104, wherein the priority component 110 sets priority for messages in a session or conversation.

The service broker 120 can implement dialogs, which are bidirectional streams of messages between two endpoints of message senders 102, 104. Messages in a dialog can be ordered and prioritized, and dialog messages delivered based on the order set by the priority component 110. Such order can be maintained across: transactions, input threads, output threads, crashes restarts, and the like. Each message can include a conversation handle that uniquely identifies the dialog that is associated with it.

Moreover, the priority component 110 can apply priority to messages across sessions to add priority capabilities on top of service broker(s) 120, and enable setting priority for all the messages in a session or conversation. Accordingly, an administrator or application can set the priority for a specific conversation, either by configuration or programmatically (e.g., to enable configuring/applying priority to a session of messages.) Such priority can further affect the order in which messages from different conversations are sent and the order in which they are received. The messages can typically include any type of messages exchanged between sender(s) or receivers, and can include any type of data such as—but not limited to—registration messages, query information, and the like.

For example, the service broker 120 can facilitate conveyance of database query registration information and transmission of a database message associated with the sender 102 or receiver 104, a queue to store database query registration information from the service broker, and a notification delivery service to transmit a database message. The system 100 can further employ various mechanisms for receiving registration requests, assembling registration messages, transmitting registration messages, detecting database changes, and providing database change notifications.

Such database query registration information can include plurality of queues to store database query registration information provided to the service broker 120, and a notification delivery service (not shown) to transmit messages based at least in part on the database query registration information. It is to be appreciated that a component (e.g., a client, a user and an application) can register (e.g., subscribe) a database query with the system 100. Query registration typically includes providing database query registration information in conjunction with and/or separate from a request for query results. Database query registration information can include a unique identifier, a delivery address, a queue name, a time-out period, and various communication and security options, for example.

Figure 2:
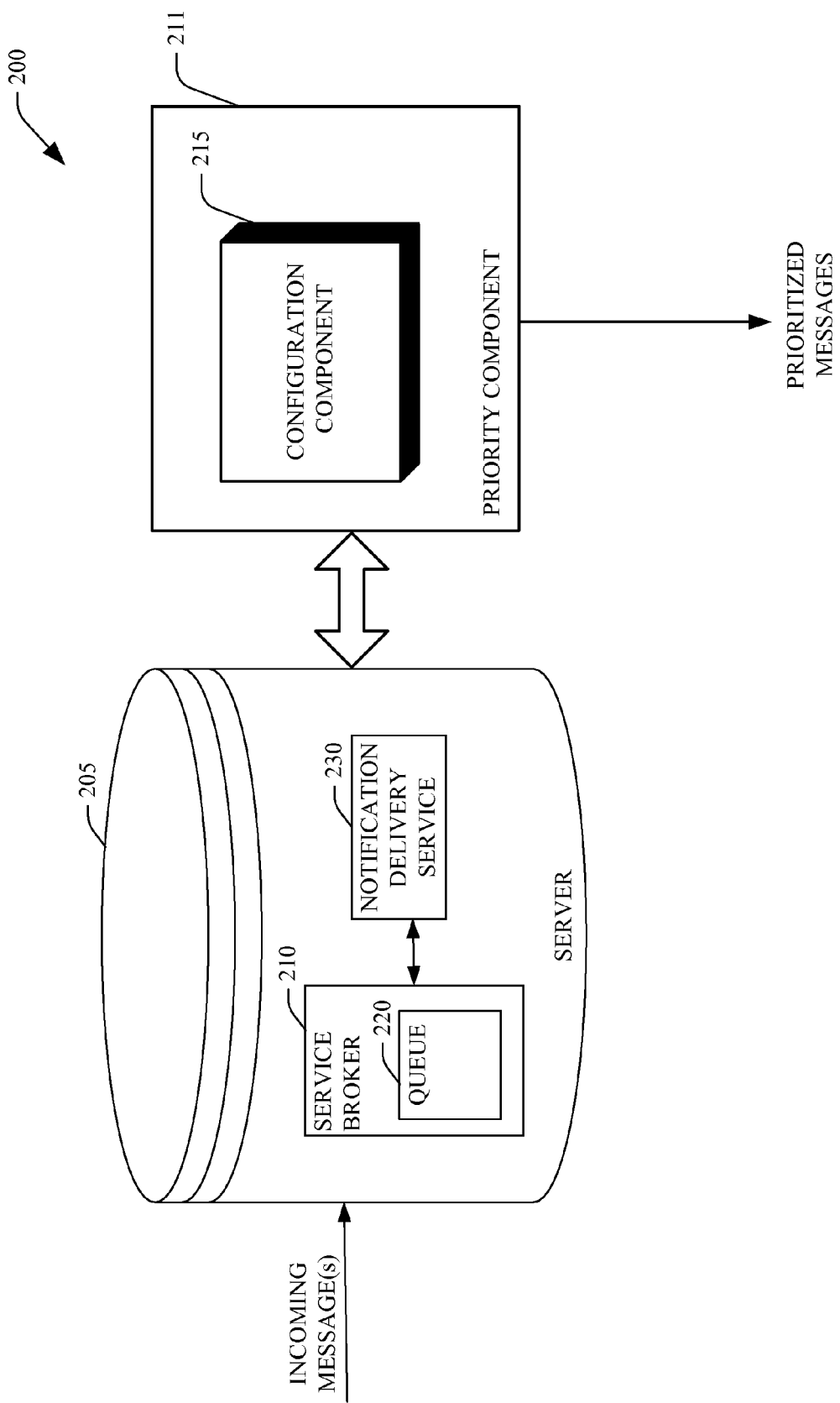
FIG. 2 illustrates an exemplary block diagram of a configuration component in accordance with an aspect of the subject innovation.

FIG. 2 illustrates a configuration component 215 as part of a priority component 211 in accordance with an exemplary aspect of the subject innovation. It is to be appreciated that FIG. 2 is schematic in nature and the priority component 211, and/or the configuration component can be part of the service broker 210 and live on the server 205. Moreover, priority can be applied at receive time, e.g. when a message has already arrived at the target queue, priority is used in determining which messages the receiver will pull from the queue. The configuration component 215 can implement configuration rules that are exposable as TSQL statements to apply configurations (e.g., automatically) to session(s). Such session(s) can further be associated with a contract (e.g., based on a local service name, remote service name, and the like.) The priority can be set automatically at each endpoint when the session is created, based on a set of Configuration Rules. At the initiator endpoint, the session is typically created programmatically, and at the target endpoint, the session is typically created when the first message of that session is received. Each configuration rule can contain a numeric identifier and a name that are unique and either is used to identify the configuration rule.

The server 205 includes the service broker 210 to facilitate storing and conveying messages, a queue 220 to store messages, and a notification delivery service 230 to transmit messages. The service broker 210 facilitates storing and transmitting messages. As noted supra, messages can be assembled when needed. For example, a message can be assembled and sent after a database query. The message can then be transmitted to the server 205 as a message, for example. Each message typically contains a unique identifier in addition to the content of the message. Messages can be associated with sessions, and sessions can be associated with services. Configuration information for sessions and services typically contains at least one of a unique identifier, a delivery address, a queue name and a time-out period.

The service broker 210 stores at least a portion of the message (e.g., the unique identifier) in the queue 220 and invokes the notification delivery service 230. The queue 220 employed is typically determined by extracting the queue name from the configuration information. For example, invocation of the notification delivery service 230 includes activating the notification delivery service 230, if it is not already active. Providing an activation mechanism mitigates the overhead associated with configuring and/or manually initiating the notification delivery service 230 prior to a database change that would affect the results of the registered query. However, the notification delivery service 230 and the queue 220 can be pre-configured. In addition, the activation mechanism provides "handshaking" to verify communication to mitigate transmitting information that can be lost if the notification delivery service 230 is not activated. It is to be appreciated that the notification delivery service 230 can additionally be activated by another component(s), for example upon system startup (e.g., a hard boot and a soft boot), by an external stimulus and/or a user.

An activated notification delivery service 230 can access the queue 220. The activation period is typically determined by a parameter that can be provided via the configuration information, additional information transmitted prior to, concurrent with and/or subsequent to the configuration information, or during set-up (e.g., configuration) of the notification delivery service 230, or dynamically while the notification delivery service 230 is activated as a default, or a combination thereof. The parameter can specify an absolute length of time (e.g., predetermined number seconds after being activated), a predetermined number of queue entries to service, and/or a period of inactivity (e.g., if no new database query registration information is delivered to the queue 220 for a specified period), for example.

The configuration information typically includes a delivery address signifying where to send the prioritized messages. The delivery address can be extracted and employed to transmit such prioritized messages. In addition, the configuration information typically includes a unique identifier that can be employed in the prioritized messages to facilitate the notification runtime service with delivering an invalidation notification (e.g., raise an event and set a flag) to a component(s) that registered to receive the notification.

It is to be appreciated that various techniques can be employed to determine whether the database prioritized message is delivered and/or received, for example. A first technique involves an acknowledgment (e.g., ACK) from the receiving device. The ACK can indicate a successful (e.g., uncorrupted) transmission of the prioritized message and can invoke the commitment of the priorities. Moreover, it is to be appreciated that although the service broker 210 is illustrated within the server 200, the service broker 210 can reside in a client or in another server. In addition, the service broker 210 can be a database (e.g., SQL based), and can include more than one queue 220 and/or notification delivery service 230. Furthermore, it is to be appreciated that more than one notification delivery service can be employed as described above. For example, more than one notification delivery service can access the queue 220. In addition, more than one notification delivery service can access a plurality of queues (e.g., queues 220), serially and/or concurrently, including a substantially similar queue (e.g., queue 220).

Figure 3:
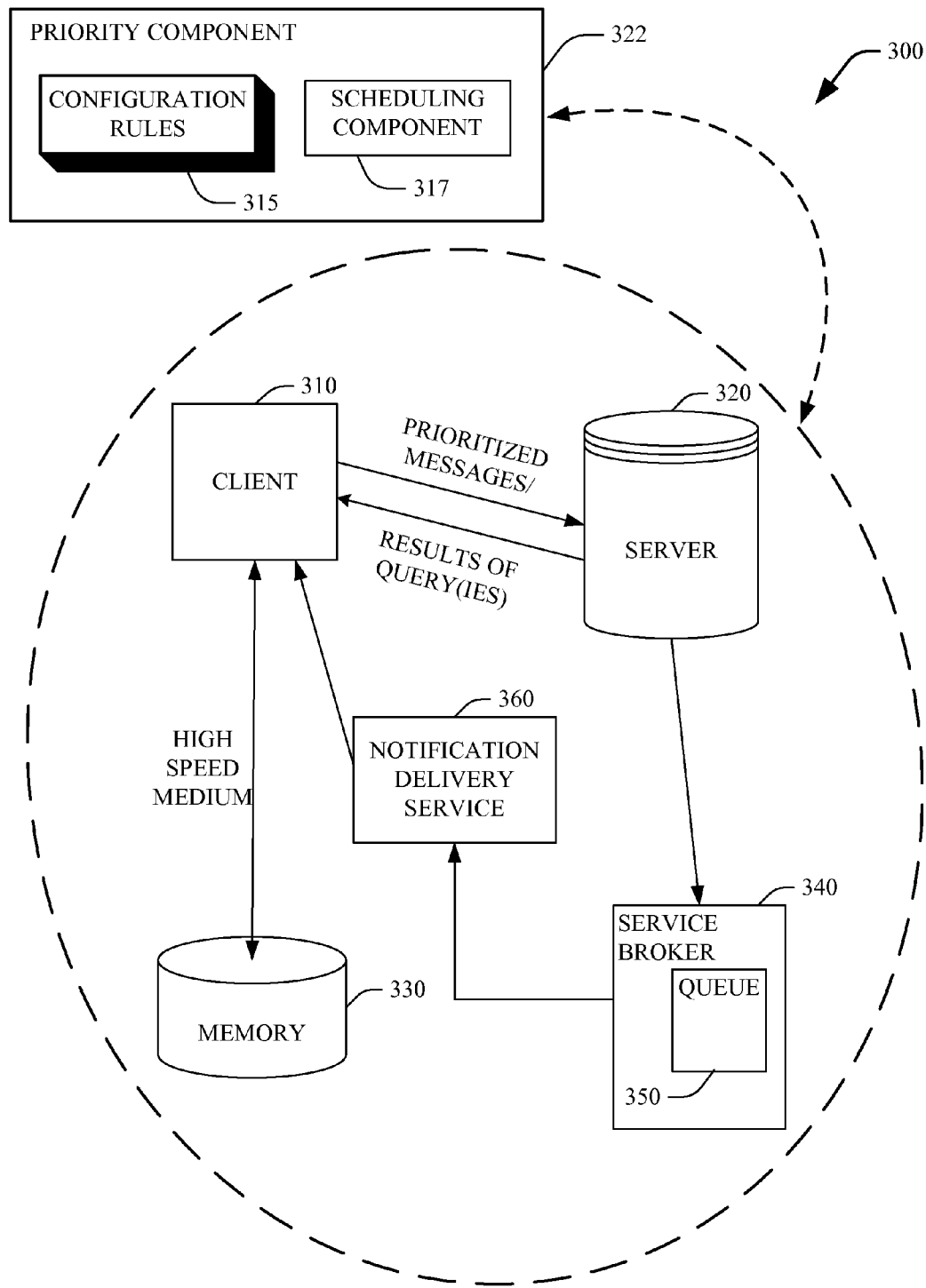
FIG. 3 illustrates a priority component having configuration rules that contain a set of criteria values in accordance with an aspect of the subject innovation.

FIG. 3 illustrates configuration rules 315 that contain a set of criteria values, wherein columns are employed to verify if a rule matches a specific session. For example, null values indicate wildcards that match any value, and there cannot be multiple configuration rules with identical sets of criteria value—however, there may be overlapping configuration rules with wildcards. Hence, each end point 310, 320 can be configured independent of: other end points, send or receive, for example. In a related aspect, a scheduling component 317 can be associated with the priority component 322 to employ a transport layer for sending messages with starvation prevention after sessions have been created and priority classes defined, wherein lower priority messages are conferred a chance to be sent, even if there are higher priority messages ready to send. Effective priorities are defined that are incremented upon a predetermined number of times messages associated with a session or priority are processed.

The scheduling component 317 or scheduler accounts for priority for ordering of: sessions (dialogs) within a message sender (service), message senders within a destination (connection) and destinations. As such, the priority of the scheduling component 317 can be defined as the priority of the highest priority scheduleable unit it contains. Such implies that the priority of a destination is the priority of the highest priority message sender it contains, and the priority of a service is the priority of the highest priority session it contains. Furthermore, destinations and message senders can change priority based on changes to the contained message senders or sessions. For example, the following terminology can be employed wherein:

PL=Priority Level=the priority of the dialog or for connections, the priority of the highest priority dialog on the connection.

EP=Effective Priority=The priority used for comparing the priorities of the corresponding PL's in determining which to select.
SU=Schedulable Unit=The item to be scheduled.
CU=Containing Unit=The higher level item containing lists of the CU's.

Likewise, for scheduling destinations within an instance, the following can be defined
SU=destination.
CU=instance.

Similarly, for scheduling message senders within a destination, the following can be defined
SU=message sender.
CU=destination.

Moreover, for scheduling sessions within a message sender:
SU=session
CU=message sender At each CU, an array of priority levels can be kept, e.g. 0-9. Each row in the array contains the priority (which equals the index), the effective priority, and the header for a list of SU's. Likewise, each SU is appended to the end of the list with the corresponding PL. The array element with the highest EP is chosen for processing. If a tie exists, the element with the lowest PL can be chosen. Moreover, the SU to be processed is taken from the head of the list at the chosen array element.

In one aspect, the effective priority is initially equal to the priority, and processing is ordered by the effective priority, wherein SU(s) within each list are processed round robin. The effective priority of an element in the array with SU(s) waiting to be processed can then be periodically incremented based on the number of SU(s) being processed, e.g., #SU's processed mod 5. When an SU is processed, the effective priority of the corresponding array element is reset to the priority. Moreover, if an SU moves to a higher PL (due a higher priority dialog being added to the connection), set EP(PL New)=Greater(EP(PL New), EP(PL Old)). If an SU moves to a higher PL (due a higher priority dialog being added to the connection), such can be appended to the end of the list. Likewise, if an SU moves to a lower PL (due to its higher priority dialogs getting processed), such can be appended to the end of the list.

As illustrated, the system 300 includes end points in form of a client 310, a server 320, a memory 330, a service broker 340, a queue 350, and a notification delivery service 360. The client 310 can include a mechanism(s) (not shown) to register a database query(ies) with the server 320 and to receive an associated prioritized message from a notification delivery service, as described herein. Registration typically comprises constructing a database registration message that includes database query registration information, a delivery address, a unique identifier (e.g., a globally unique identifier, or GUID), a queue name, a time-out period, and optionally additional information such as communication (e.g., protocol and port) and security (e.g., encryption and authentication) options, for example. The database registration message can then be transmitted to the server 320. It is to be appreciated that more than one client (e.g., more than one client 310) and/or other component(s) can register one or more database queries, serially and/or concurrently, and in accordance with an aspect of the subject innovation. Furthermore, a plurality of clients can register queries that return substantially similar results.

In one aspect of the subject innovation, the prioritized messages can be transmitted to the server 320 with a query (e.g., a query associated with the database query registration information included in the database registration message). The query results can be stored in the memory 330 and/or in other storage devices, including storage on a web server. Storing the results in the memory 330 provides the client 310, as well as any other clients, the ability to utilize the stored results instead of performing subsequent queries when the subsequent queries would return substantially similar results. The notification delivery service 360 can employ the database query registration information to construct and deliver prioritized messages to the client 310. For example, the notification delivery service 360 can extract and utilize the delivery address and the unique identifier (e.g., GUID) from the database query registration information. The unique identifier is typically included within the prioritized messages, and the change message is generally delivered to the delivery address (e.g., the notification runtime service associated with the client 310).

Figure 4:
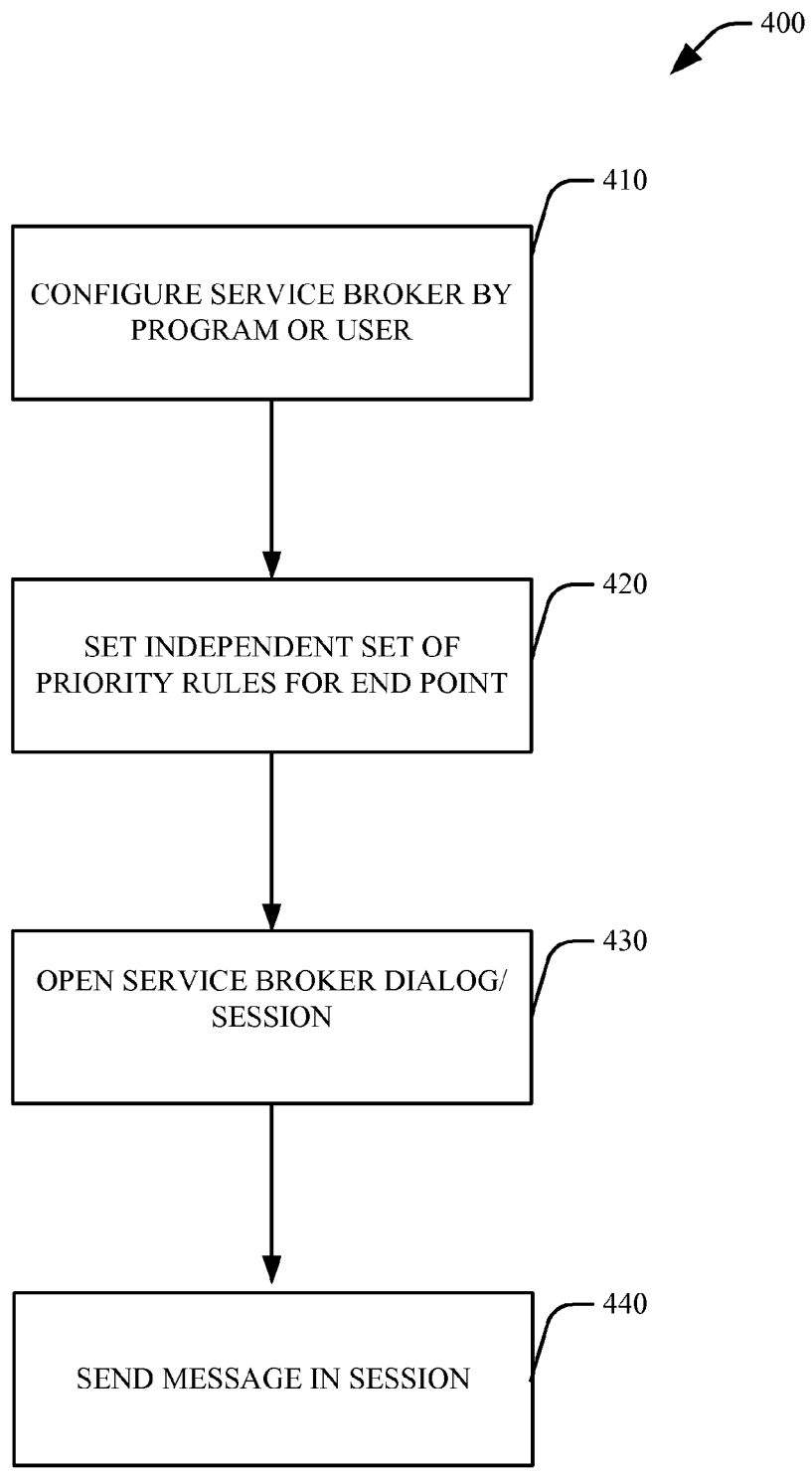
FIG. 4 illustrates a methodology of prioritizing and sending messages according to an aspect of the subject innovation.

FIG. 4 illustrates a methodology 400 of prioritizing and sending messages in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410 a service broker can be configured by a program or a user, wherein SQL server objects for services and contracts, routes for remote servers, configuration of property rules, can be created, for example. Subsequently and at 420, independent set of priority rules for end point(s) can be set. The methodology then proceeds to act 430, wherein service broker dialog session can be opened. At 440, the messages can then be sent.

Figure 5:
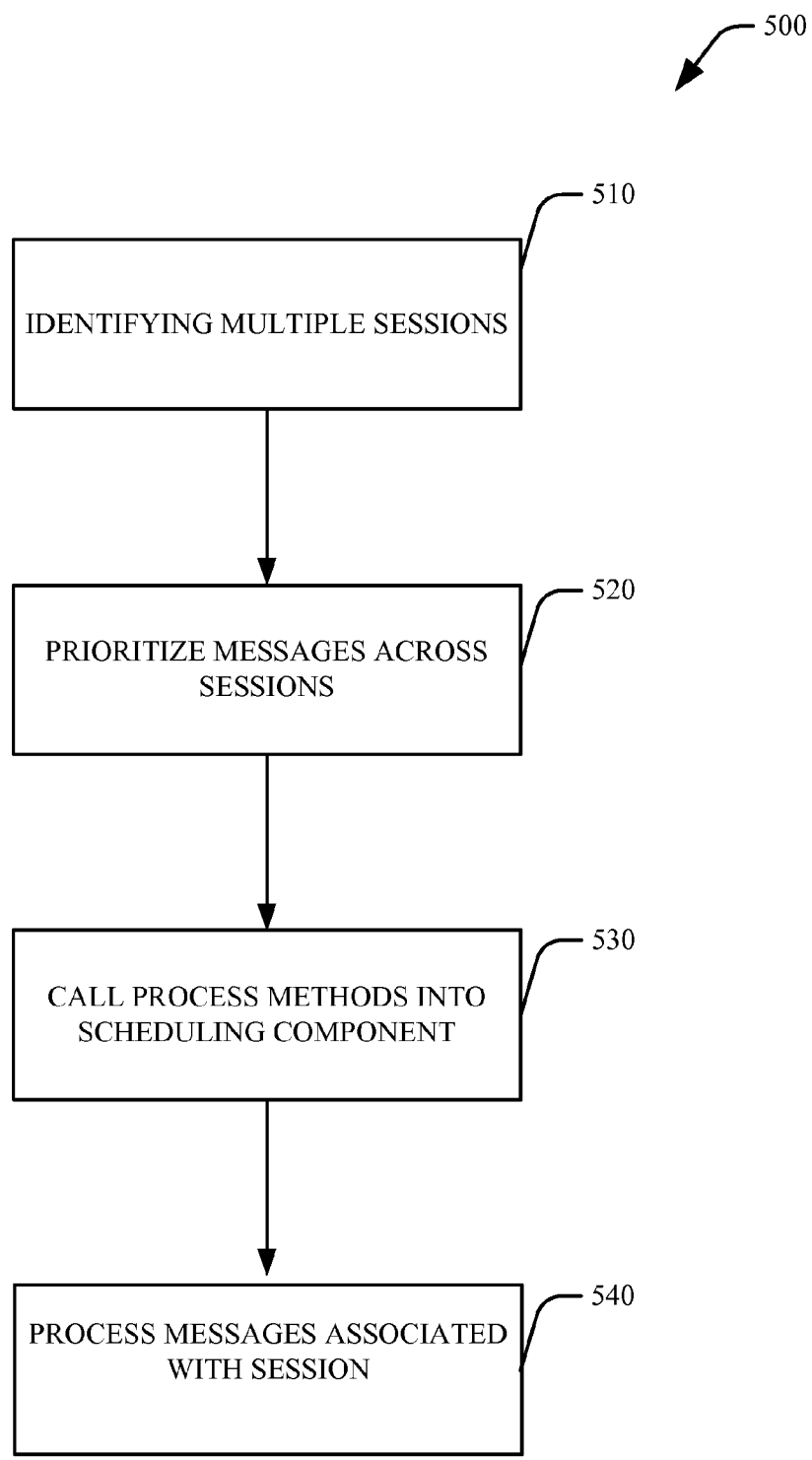
FIG. 5 illustrates a related methodology of prioritizing messages across sessions according to an aspect of the subject of innovation.

FIG. 5 illustrates a related methodology 500 prioritizing messages across sessions according to an aspect of the subject of innovation. Initially and at 510 multiple sessions can be identified between a sender(s) and a receiver(s). At 520, messages across sessions can be prioritized, wherein end points can have different priorities for the same session. At 530, a destination manager can call process methods into the scheduling component for processing messages associated with a session at 540. Such destination manager can manage corresponding destinations and remote end points that exchange messages.

Figure 6:
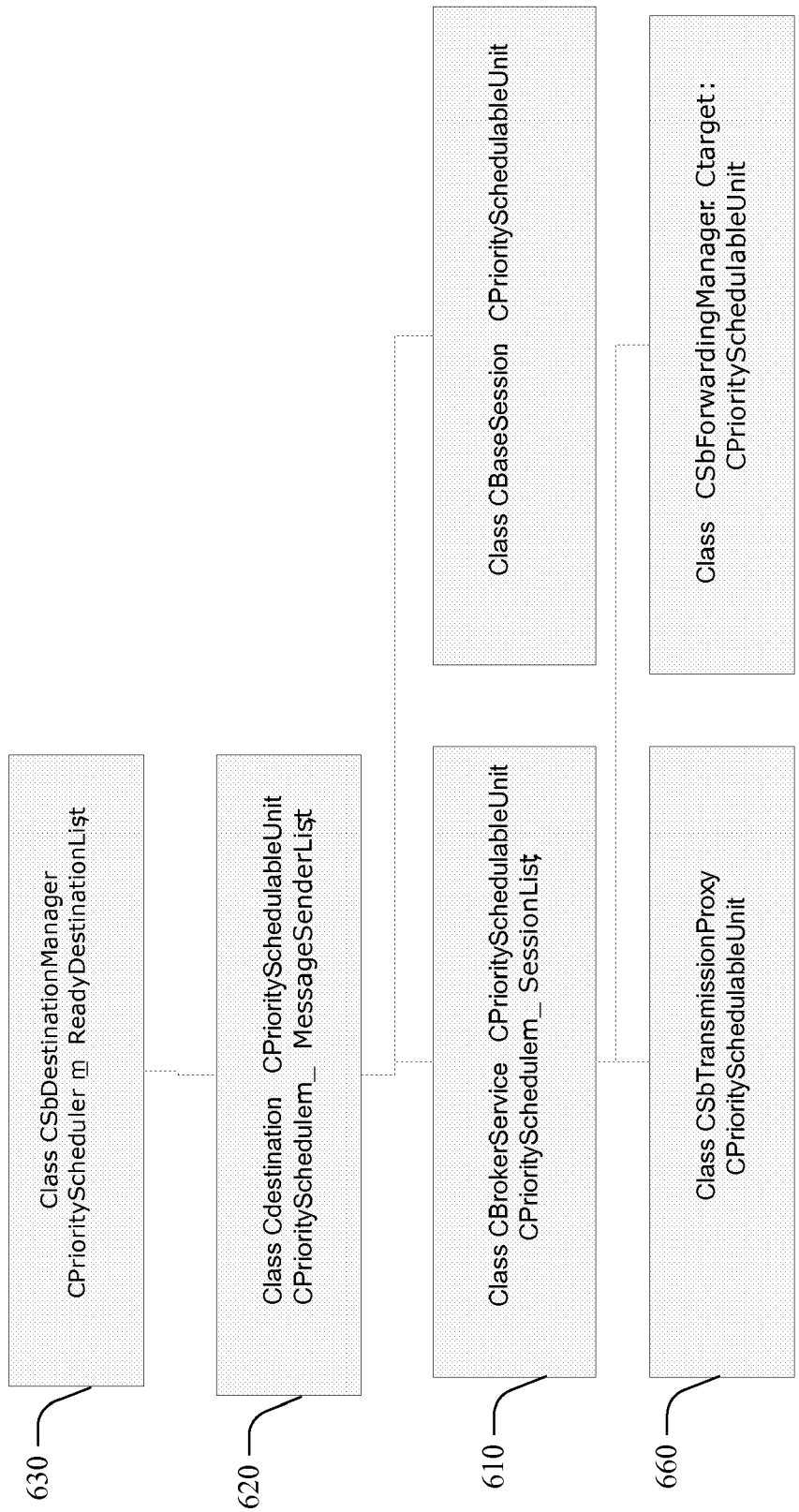
FIG. 6 illustrates an exemplary application of a scheduling algorithm to arbitrary types of elements according to an aspect of the subject innovation.

FIG. 6 illustrates an exemplary application of a scheduling algorithm to arbitrary types of elements according to an aspect of the subject innovation. As illustrated, various classes can be defined such as CPriorityScheduableUnit 610, which contains all of the methods and data that are necessary for a Schedulable Unit. In general, all entities that need to be scheduled can descend from CPriorityScheduableUnit.

Moreover, it is possible to nest instances of the Scheduler by associating a scheduler with a schedulable unit. For example, when a destination needs to be scheduled, the CDestination class 620 descends from CPriorityScheduableUnit 630. A destination also needs to schedule Message Senders, so it has member of type CPriorityScheduler. The Destination's priority is the aggregate priority exposed by the scheduler. In one aspect, the aggregate priority of a scheduler is equal to the priority level of the highest priority schedulable unit that it has available to be scheduled. It is to be appreciated that the aggregate priority can be calculated by formulas based on other factors, such as the number of schedulable units it has available to be scheduled, or the average priority of those units, and the like.

In a scenario for nested schedulers, priority changes at the lower levers can affect priorities at the higher levels. As such, a calling mechanism is defined to allow schedulers and schedulable units to call into the containing scheduler or schedulable unit to advise it of a priority change.

As illustrated in FIG. 6 new instance of CSbTransmissionProxy 660 with a high priority is appended to the scheduler CBrokerService::m_SessionList. Likewise, CBrokerService::m_SessionList appends the new CSbTransmissionProxy to the appropriate list, and updates its aggregate priority. Similarly, CBrokerService::m_SessionList calls into the CPrioritySchedulableUnit that CBrokerService is descended from to advise it of its new aggregate priority. Moreover, the CPrioritySchedulableUnit that CBrokerService is descended from calls into CDestination::m_MessageSenderList to advise it of its new priority.

In addition, CDestination::m_MessageSenderList moves the CPrioritySchedulableUnit that CBrokerService is descended from to the appropriate list, and updates its aggregate priority. Moreover, CDestination::m_MessageSenderList calls into the CPrioritySchedulableUnit that CDestination is descended from to advise it of its new aggregate priority. In addition, the CPrioritySchedulableUnit that CDestination is descended from calls into CSbDestinationManager::m_ReadyDestinationList to advise it of its new priority. Furthermore, CSbDestinationManager::m_ReadyDestinationList moves the CPrioritySchedulableUnit that CDestination is descended from to the appropriate list, and updates its aggregate priority.

For example, priority setting on the dialog endpoint can include keeping priority in the "m_bPriority" member of CDialogEndpointMetadata. Likewise, CDialogEndpointMetadata can expose a GetPriority( ) method, wherein the priority will be passed in as a parameter to CDialogEndpointMetadata::InitService. Likewise, on the initiator endpoint, where a dialog is created with the "begin dialog conversation priority" command, CDialogEndpoint::BeginDialog can call LookupPriority. It will then pass it in to CDialogEndpointMetadata::InitService. Typically, all parameters for LookupPriority already exist in CDialogEndpoint::BeginDialog.

Figure 7:
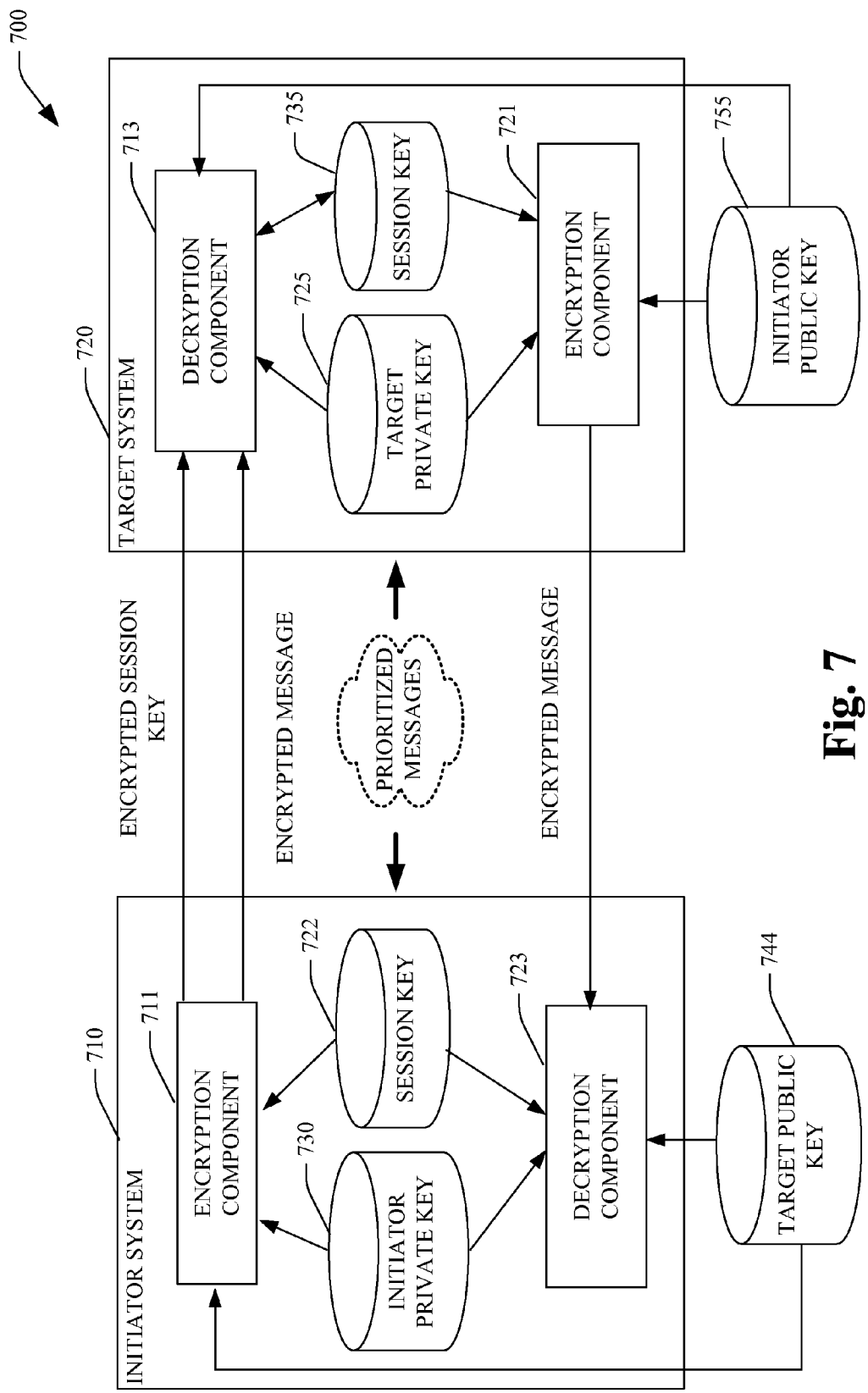
FIG. 7 illustrates a broker services system with prioritization capabilities in accordance with an aspect of the subject innovation.

On the target endpoint where the dialog endpoint is created during receive of the first message, CDialogEndpoint::FCreateTarget can call LookupPriority. It will then pass it in to CDialogEndpointMetadata::InitService. In general, all parameters for LookupPriority are already available in CDialogEndpoint::FCreateTarget.k FIG. 7 illustrates a broker services system 700 in accordance with an aspect of the subject innovation. The system 700 includes an initiator system 710 and a target system 720. The initiator system 710 includes an encryption component 711 and a decryption component 723. The initiator system 710 has secure access to an initiator private key 730 and a session key 722. Furthermore, the initiator system 710 has access to a target public key 744. In general, the session key can be employed, for example, to encrypt and/or decrypt message(s) that form a dialog between an initiator system and target system(s). Such dialog refers to a single bidirectional streams of messages between two endpoints (e.g., initiator and target systems). For example, two endpoints can have zero, one or more dialog(s) ongoing at any particular time. In one example, all messages in a dialog are ordered and dialog messages are always delivered in the order sent. The order is maintained across transactions, across input threads, across output threads, and across crashes and restarts. Further, a "message" can include a conversation handle that uniquely identifies the dialog associated with it. For example, an order entry application can have dialogs open simultaneously with a shipping application, an inventory application and a billing application. Because messages from each application have a unique conversation handle, identifying which application sent each message can be readily performed.

The target system 720 includes an encryption component 721 and a decryption component 713. The target system 720 has secure access to a target private key 725. Further, the target system 720 has access to an initiator public key 755. The encryption component 711 of the initiator system 710 encrypts the session key 722 with the initiator private key 730. The result of this first encryption is further encrypted with the target public key 744. The result of this second encryption is provided to the target system 720 (e.g., encrypted session key).

The decryption component 713 of the target system 720 receives the encrypted session key and decrypts it with the target private key 725. The result of this first decryption is further decrypted with the initiator public key 755. The result of the second decryption is the session key 722 that can be securely stored by the target system 720. Thereafter, the initiator system 710 and the target system 720 can be engaged in a dialog employing message(s) encrypted with the session key 735. In order to facilitate authenticity of the sending entity, the message(s) encrypted with the session key 735 can further be signed with the initiator private key 730. It is to be appreciated that the broker services system 700, the initiator system 710 and/or the target system 720 can be computer components as that term is defined herein.

The system 700 can apply priority across sessions to add priority capabilities on top of service brokers, and enable setting priority for all the messages in a session or conversation. Accordingly, an administrator or application can set the priority for a specific conversation, either by configuration or programmatically (e.g., to enable configuring/applying priority to a session of messages.) Such priority can further affect the order in which messages from different conversations are sent and the order in which they are received.

Figure 8:
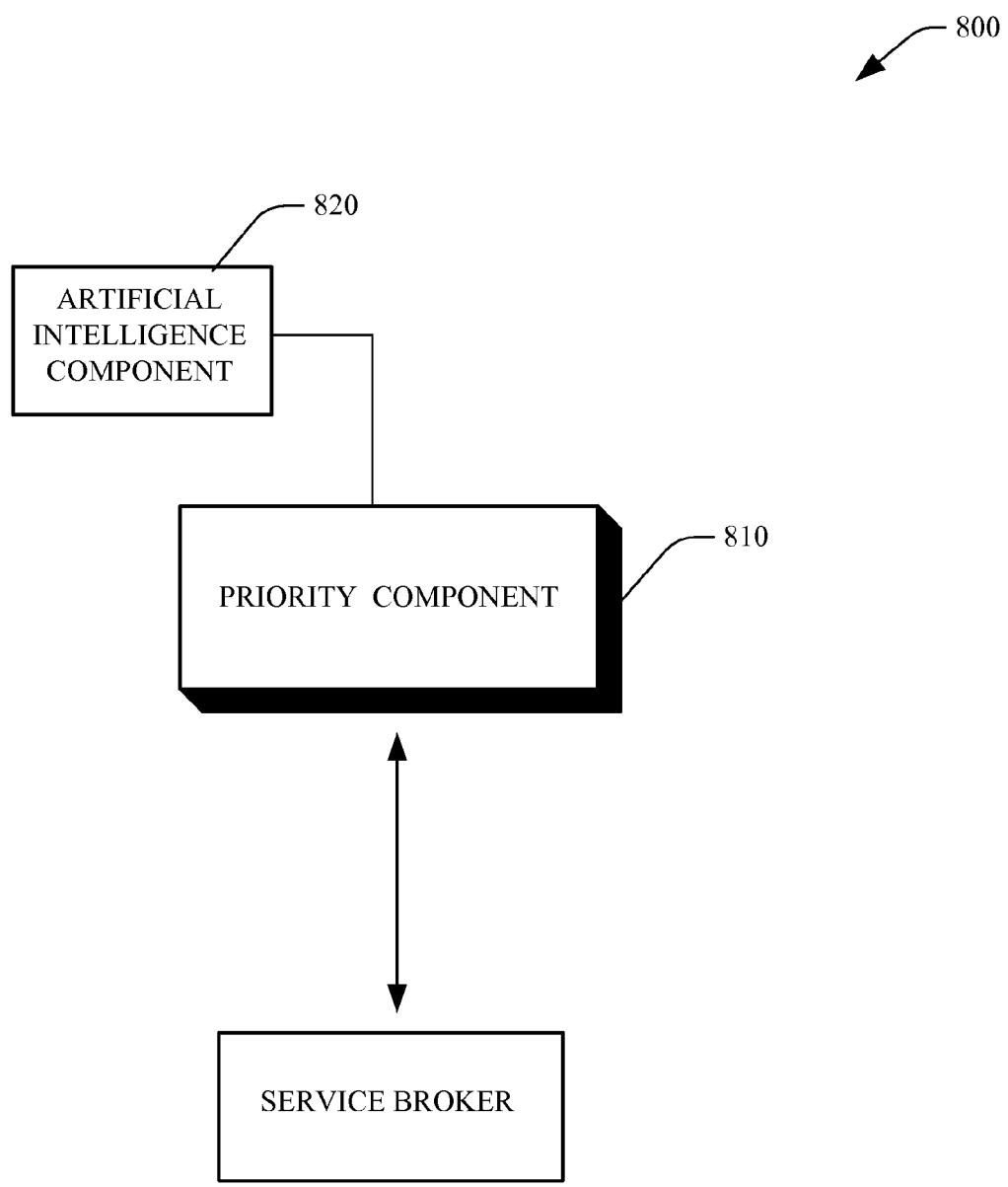
FIG. 8 illustrates an artificial intelligence (AI) component that can be employed to facilitate inferring and/or determining when, where, how to implement prioritization (e.g., based on configuration rules) in accordance with an aspect of the subject innovation.

FIG. 8 illustrates an artificial intelligence (AI) component 820 that can be employed to facilitate inferring and/or determining when, where, how to implement prioritization (e.g., based on configuration rules) in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 820 can employ any of a variety of suitable AI-based schemes as described supra in connection with facilitating various aspects of the herein described invention. For example, a process for learning explicitly or implicitly how (or which) rule to employ can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
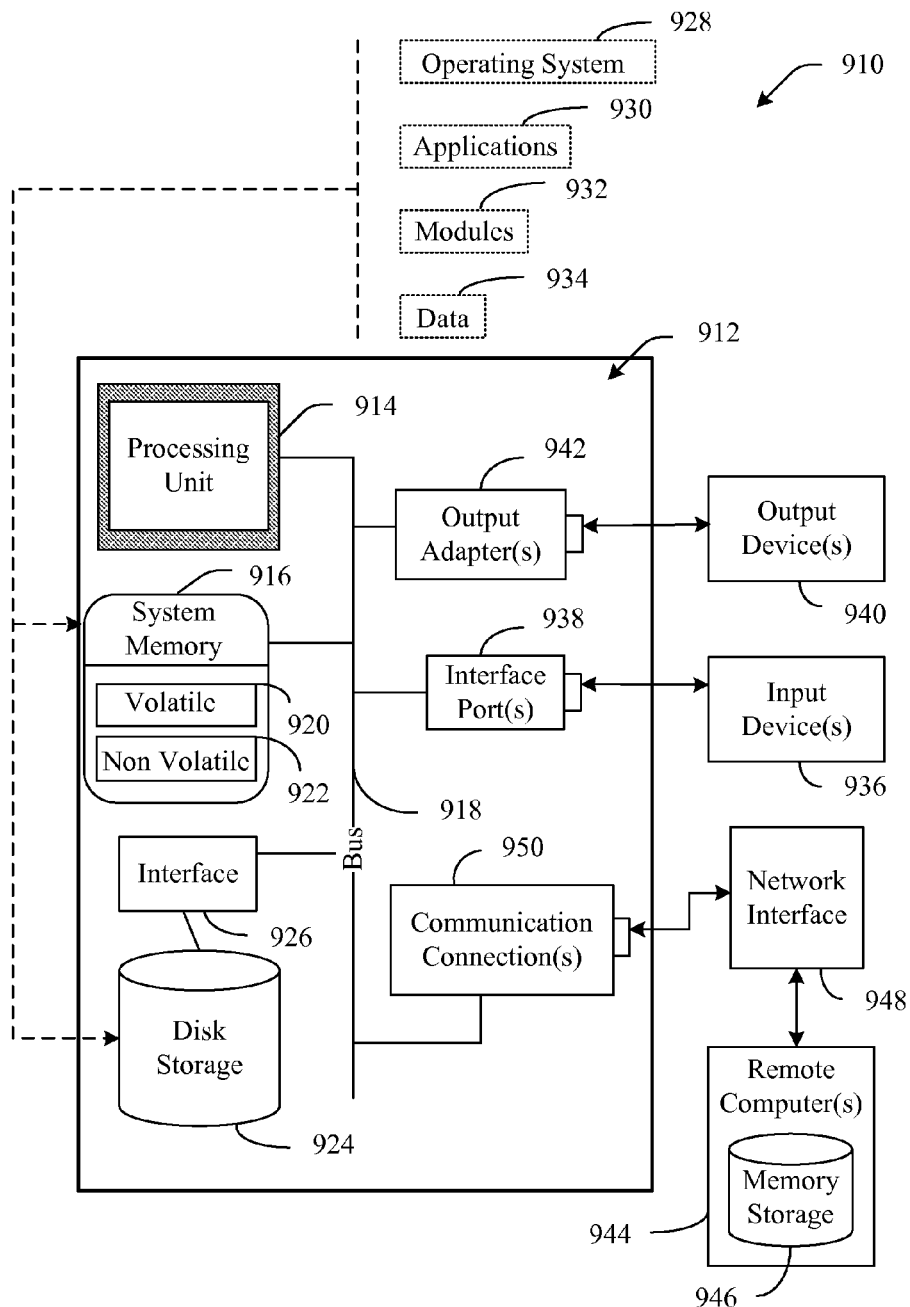
FIG. 9 illustrates a schematic block diagram of a suitable operating environment for implementing aspects of the subject innovation.
Figure 10:
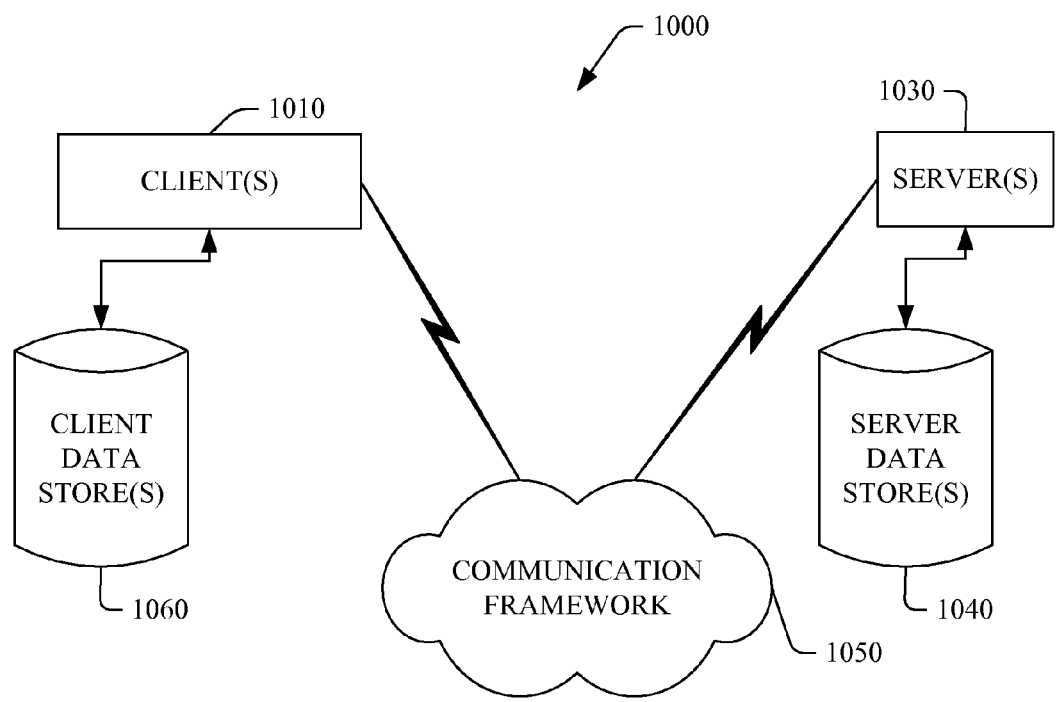
FIG. 10 illustrates a further schematic block diagram of a sample-computing environment for the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented.

While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of prioritizing messages in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented at an initiator messaging endpoint that includes one or more processors and memory storing instructions which, when executed by the one or more processors, implement the method for prioritizing the communication of messages with a destination messaging endpoint, the method comprising:

an act of an initiator messaging endpoint, which includes one or more processors, initiating a plurality of communications sessions with one or more destination messaging endpoints, including a first communications session and a second communications session, wherein each of the plurality of communications sessions are established to exchange a plurality of messages between the initiator messaging endpoint and a corresponding destination messaging endpoint;

an act of the initiator messaging endpoint establishing relative session priorities for each of the plurality of communications sessions based on defined configuration rules for the initiator messaging endpoint, the relative session priorities used by the initiator messaging endpoint to determine how to prioritize sending messages over each of the plurality of communications sessions and how to prioritize pulling received messages from one or more queues, wherein the relative session priorities include: (i) a higher session priority for messages sent and received as part of the first communications session; and (ii) a lower session priority for messages sent and received as part of the second communications session;
an act of the initiator messaging endpoint prioritizing sending messages across sessions by sending at least a first message sent over the first communications session in preference to sending at least a second message over the second communications session, based on the relative session priorities at the initiator messaging endpoint; and
an act of the initiator messaging endpoint prioritizing receiving messages across sessions by retrieving at least a first message received over the first communications session from a queue corresponding to the first communications session in preference to retrieving at least a second message received over the second communications session from a queue corresponding to the second communications session, based on the relative session priorities at the initiator messaging endpoint.

2. The method of claim 1, wherein each of the plurality of configuration rules include one or more criteria values for matching said configuration rule to one or more communications sessions.

3. The method of claim 2, wherein criteria values of a first configuration rule match a first destination endpoint and criteria values of a second configuration rule match a second destination endpoint, such that different configuration rules are applied to the first destination endpoint and the second destination endpoint.

4. The method of claim 1, further comprising:
an act of the initiator messaging endpoint implementing starvation prevention by granting at least one message communicated as part of the second communications session priority over at least one message communicated as part of the first communications session, despite the relative session priorities.

5. The method of claim 1, wherein the act of the initiator messaging endpoint establishing relative session priorities for each of the plurality of communications sessions comprises:
assigning different priorities for messages sent as part of a communication session and messages received as part of a communication session, such that the initiator messaging endpoint applies a different priority to sending messages over a communications session than messages received over the communications session.

6. The method of claim 1, wherein the one or more destination messaging endpoints comprises a single destination messaging endpoint, and wherein the initiator messaging endpoint applies different relative session priorities to the first communications session and the second communications session than the single destination messaging endpoint.

7. The method of claim 1, wherein the plurality of configuration rules are exposable as TSQL statements.

8. The method of claim 1, wherein each of the plurality of configuration rules includes a numeric identifier for identification of the configuration rule.

9. The method of claim 1, further comprising:
an act of the initiator messaging endpoint defining configuration information for each of the plurality of sessions, including:
a unique identifier;
a delivery address signifying where to send messages;
a queue name to use when communicating messages; and
a time-out period.

10. The method of claim 1, wherein one or more of the plurality of messages comprise a database query and wherein one or more of the plurality of messages are encrypted.

11. The method of claim 1, wherein the one or more destination messaging endpoints also establish relative session priorities for each of the plurality of communications sessions based on defined configuration rules for each of the destination messaging endpoints, the relative session priorities at each destination messaging endpoint used by each destination messaging endpoint to prioritize sending and receiving messages over corresponding communications sessions, such that any messages received at the initiator messaging endpoint over any of the plurality of communications sessions have been previously prioritized by a destination messaging endpoint.

12. A method implemented at a destination messaging endpoint that includes one or more processors and memory storing instructions which, when executed by the one or more processors, implement the method for prioritizing the communication of messages with an initiator messaging endpoint, the method comprising:
an act of a destination messaging endpoint, which includes one or more processors, receiving a plurality of initial session messages, including a first initial session message and a second initial session message, wherein each of the plurality of initial session messages are received from a corresponding initiator messaging endpoint to establish a communications session between said corresponding initiator messaging endpoint and the destination messaging endpoint;
an act of the destination messaging endpoint establishing a plurality of communications sessions for each of the plurality of initial session messages, including establishing a first communications session for the first initial session message with a first corresponding initiator messaging endpoint and a second communication session for the second initial session message with a second corresponding initiator messaging endpoint, wherein each of the plurality of communications sessions are established with corresponding destination messaging endpoints to exchange a plurality of messages;
an act of the destination messaging endpoint establishing relative session priorities for each of the plurality of communications sessions based on defined configuration rules for the destination messaging endpoint, the relative session priorities used by the destination messaging endpoint to determine how to prioritize sending and receiving messages over each of the plurality of communications sessions, wherein the relative session priorities include: (i) a higher session priority for messages sent and received as part of the first communications session; and (ii) a lower session priority for messages sent and received as part of the second communications session;
an act of the destination messaging endpoint prioritizing sending messages across sessions by sending a first message sent over the first communications session priority over in preference to sending a second message over the second communications session, based on the relative session priorities; and
an act of the destination messaging endpoint prioritizing receiving messages across sessions by retrieving at least a first message received over the first communications session from a queue corresponding to the first communications session in preference to retrieving at least a second message received over the second communications session from a queue corresponding to the second communications session, based on the relative session priorities, wherein the first and second corresponding initiator messaging endpoints also establish relative session priorities for each of the plurality of communications sessions based on defined configuration rules for each initiator messaging endpoint, which are used by each initiator messaging endpoint to prioritize sending and receiving messages over corresponding communications sessions, such that any messages received at the destination messaging endpoint over any of the plurality of communications sessions have been previously prioritized by an initiator messaging endpoint.

13. The method of claim 12, wherein:

the higher session priority for the first communications session applies to messages sent as part of the first communications session only; and wherein the destination messaging endpoint grants at least one message communicated as part of the second communications session priority over at least one message received as part of the first communications session, based on the relative session priorities.

14. The method of claim 12, wherein the first corresponding initiator messaging endpoint is the same as the second corresponding initiator messaging endpoint.

15. The method of claim 12, wherein messages within each communications session are further prioritized relative to each other.

16. The method of claim 12, wherein each communications session corresponds to a corresponding service at the destination messaging endpoint.

17. The method of claim 12, further comprising changing at least one relative session priority.

18. The method of claim 12, wherein each communications session corresponds to a dialog comprising a bi-directional stream between two endpoints, and wherein each message includes a conversation handle that uniquely identifies the dialog that is associated with it.

19. The method of claim 12, wherein the plurality of configuration rules overlap through the use of wildcards.

20. One or more computer storage device having stored thereon computer executable instructions that, when executed by at least one processor of an initiator messaging endpoint, implement a method for prioritizing the communication of messages with a destination messaging endpoint, the method comprising:

an act of an initiator messaging endpoint, which includes one or more processors, opening a plurality of communications sessions with one or more destination messaging endpoints, including a first communications session and a second communications session, wherein each of the plurality of communications sessions are established to exchange a plurality of messages between the initiator messaging endpoint and a corresponding destination messaging endpoint;

an act of the initiator messaging endpoint assigning relative session priorities for each of the plurality of communications sessions based on a plurality of configuration rules, wherein the relative session priorities include: (i) a higher session priority for the first communications session; and (ii) a lower session priority for the second communications session; and an act of the initiator messaging endpoint prioritizing sending and receiving messages across sessions by granting a first plurality of messages sent and received as part of the first communications session a different priority than a second plurality messages sent and received as part of the second communications session, based on the relative session priorities, including sending a first message over the first communications session in preference to sending a second message over the second communications session and retrieving a third message from a queue corresponding to the first communications session in preference to retrieving a fourth message from a queue corresponding to the second communications session, wherein an messages received at the initiator messaging end point over an of the plurality of communications sessions have been previously prioritized by a destination messaging endpoint selected from the one or more destination messaging endpoints in accordance with other relative session priorities established at the destination messaging endpoint.

* * * * *

UNITED STATES PATENT AND TRADEMARK OFFICE
CERTIFICATE OF CORRECTION

PATENT NO. : 8,112,450 B2
APPLICATION NO. : 12/023209
DATED : February 7, 2012
INVENTOR(S) : Michael W. Thomas et al.

It is certified that error appears in the above-identified patent and that said Letters Patent is hereby corrected as shown below:

In column 16 lines 60-61, in Claim 12, after "session" delete "priority over".

In column 18, line 36, in Claim 20, delete "an" and insert -- any --, therefor.

In column 18, line 37, in Claim 20, delete "end point" and insert -- endpoint --, therefor.

In column 18, line 37, in Claim 20, delete "an" and insert -- any --, therefor.

Signed and Sealed this
Twenty-seventh Day of March, 2012

David J. Kappos
*Director of the United States Patent and Trademark Office*